United States Patent [19]

Saraydar

[11] Patent Number: 4,817,975
[45] Date of Patent: Apr. 4, 1989

[54] SELF-ALIGNING SULKY

[76] Inventor: Michael Saraydar, 241 Irving Ave., Closter, N.J. 07624

[21] Appl. No.: 608,409

[22] Filed: May 9, 1984

[51] Int. Cl.$^4$ .............................................. B62C 1/08
[52] U.S. Cl. ........................................ 280/63; 280/68; 280/69; 280/76; 280/696
[58] Field of Search .................. 280/63, 47.24, 64, 68, 280/69, 75, 76, 77, 87.1, 696, 701

[56] References Cited

U.S. PATENT DOCUMENTS

| 7,364 | 5/1837 | Hayman | 280/63 |
|---|---|---|---|
| 283,916 | 8/1883 | Newberry | 280/63 |
| 375,211 | 5/1907 | Lamberbourg | 280/63 |
| 562,702 | 6/1896 | Brockman | 280/64 |
| 1,273,593 | 7/1918 | Felicetti | 280/87.1 |
| 1,739,716 | 12/1929 | Fisher | 280/75 |
| 2,440,502 | 4/1948 | Etgen | 280/63 |
| 3,379,452 | 4/1968 | Torrisi | 280/63 |
| 3,847,408 | 11/1974 | King | 280/63 |
| 4,033,598 | 7/1977 | King | 280/63 |
| 4,071,257 | 1/1978 | Discount | 280/63 |
| 4,078,829 | 3/1978 | Davis | 280/63 |
| 4,465,291 | 8/1984 | Wylie et al. | 280/47.24 |

FOREIGN PATENT DOCUMENTS

| 674652 | 11/1963 | Canada | 280/63 |
|---|---|---|---|
| 561891 | 10/1923 | France | 280/701 |
| 1364006 | 5/1964 | France | 280/63 |
| 595871 | 7/1959 | Italy | 280/696 |

Primary Examiner—Charles A. Marmor
Assistant Examiner—Eric Culbreth
Attorney, Agent, or Firm—Hopgood, Calimafde, Kalil, Blaustein & Judlowe

[57] ABSTRACT

There is disclosed in one aspect, a self-aligning sulky with independently pivotable wheels which may be pivoted through a full 360 degree rotation. The pivotable wheels provide a sulky that provides less rolling resistance and greater resistance to tipping. In another aspect, the racing sulky is provided with steering means to alter the orientation of at least one of said wheels relative to the frame of said sulky. In yet another aspect, a suspension means for the wheels is provided.

4 Claims, 1 Drawing Sheet

SELF-ALIGNING SULKY

BACKGROUND OF THE INVENTION

The modern or low-wheeled harness racing sulky, has been used in this sport for more than eighty years. Due to their use of spoked wheels, sulkies have often been referred to as "bikes".

The conventional modern sulky essentially consists of a lightweight frame to which a pair of fixed wheels are mounted. The seat is normally mounted to the frame slightly behind the wheels at a level approximately even with the top of the wheels. Most sulkies are about five feet wide, measure between twenty five to thirty-two inches to the seat and weigh about forty pounds.

A major disadvantage of the prior art racing sulky is its susceptibility to tipping. These lightweight vehicles are drawn about an oval race course by specially trained horses at speeds in excess of 30 miles per hour. In the course of a race, maneuvering for position and unexpected traffic developments may cause even the best trained horse to mis-step or veer suddenly to one side. With conventional fixed wheel sulkies such sudden lateral movements by the horse have often produced serious accidents. The prior art sulky, due to its fixed position wheels, exhibits a resistance to sudden lateral movements, the wheel on the side of movement digs into the track and translates the lateral movement of the sulky into a vertical tipping force. Sometimes the trailing wheel merely leaves the ground momentarily; however often this results in a spill.

A second disadvantage of the prior art sulky is also related to its resistance to lateral movement. Since the sulky is harnessed directly to the horse it reacts to, or attempts to follow, the movement of the horse. The resistance to lateral movement mentioned above is thought to slow the prior art sulky. With each step, the horse's rolling gait is transmitted to the sulky in the form of a succession of alternating sidewise displacement forces. These sidewise forces are resisted by the fixedly mounted wheels This clashing of the horse's movement and sulky's resistance has two potential detrimental effects. First, the effect of sidewise force may slow rotation of the wheels through increased friction with the track. Second and more importantly, this resistance restricts the rolling movement of the horse's gait and may thus slow the horse's pace.

Another disadvantage of the fixed-wheel sulky is its resistance to turning. On an oval track a good amount of the circuit consists of turning movements. The fixed wheel sulky resists the turn and produces torsional stresses on the harness shafts which restrict the horse's movements and may also result in a tipping action.

U.S. Pat. No. 3,847,408 discloses a single shaft fixed wheel sulky which realizes the advantage of eliminating some of these interferences with the horse's movements. Indeed, this sulky was reported to produce up to five second improvement in a horse's time over other fixed wheel sulkies. However, since this design permitted the horse to nearly turn around in its harness, it proved to be too dangerous and the regulations were changed to prohibit its use.

The search has continued for an improved sulky which will reduce the risk of tipping and produce improved performance.

OBJECTS AND SUMMARY OF THE INVENTION

Accordingly, it is a general object of the present invention to avoid or substantially alleviate the above-identified problems of the prior art.

A more specific object of the invention is to provide a self-aligning sulky.

Another object of the invention is to provide a sulky which is resistant to tipping.

Other objects and advantages of the present invention will become apparent from the following summary of the invention.

The present invention provides a self-aligning sulky having independently pivotable wheels. In other embodiments the sulky further comprises means for adjusting the orientation of the sulky for horses of varying stature, means for steering at least one of the independently pivotable wheels and independent suspension means.

DETAILED DESCRIPTION OF THE PREFERRED EMBODIMENT

The present invention provides a self-aligning harness racing sulky having pivotable wheels. As used herein, the term self-aligning means that the sulky can follow the lateral movement of the horse behind which it is drawn without exhibiting significant resistance.

Figure 3:
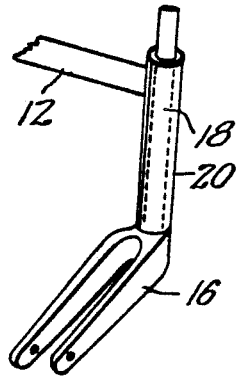
FIG. 3 is a detail view of the wheel pivoting mechanism.
Figure 5:
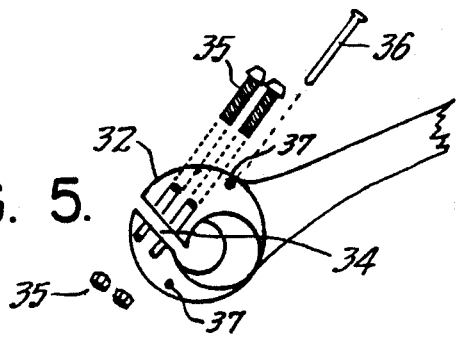
FIG. 5 is a detail view of the harness shaft adjustment collar.

The self-aligning sulky 10 comprises a transverse frame 12 having first and second pivotable wheels 14a, 14b mounted substantially at opposite ends thereof. Pivotable wheels 14 are preferably mounted to the underside of frame 12 as shown in FIG. 3, each wheel 14 is rotatably mounted to a U-shaped trailing arm 16. Connecting to trailing arm 16 is a rod 18 which rotates within a vertical tube 20 fixed to frame 12 to permit trailing arm 16 and wheel 14 to rotate 360°. Of course other means of mounting wheels 14 may also be employed. As noted, wheels 14 are freely pivotable through a full 360 degrees of rotation. The use of wheels 14 having a lesser degree of rotation is possible.

To maximize the responsiveness of the sulky of the present invention to lateral movements of the horse, it is preferred that the axis of tube 20 about which each of said wheels 14 pivots be a substantially vertical axis when the sulky is in operational orientation. This vertical orientation of the axis presents the least resistance to rotation in reaction to a displacing force, especially under a loaded condition.

The sulky of the present invention is provided with a seat 22 rearwardly mounted to frame 12 for support of a driver. Seat 22 further includes an adjustment means 24 for varying the position of the driver relative to frame 12. Adjustment means 24 may be a in the form of clamp which is slidable on a rearwardly extending support bar 26 or any similar means of adjustment. This provides an adjustment to compensate for the varying weights of drivers as well as a means for regulating the amount of load borne by the harnessed horse.

The sulky is harnessed to the horse by means of forwardly projecting first and second shafts 28a, 28b which are mounted to frame 12. As with conventional sulkies, the horse is harnessed between shafts 28. The amount of load, or effective weight borne by the horse due to the force exerted by the forward ends of shafts 28 may be varied by adjusting the position of seat 22 relative to frame 12.

Figure 1:
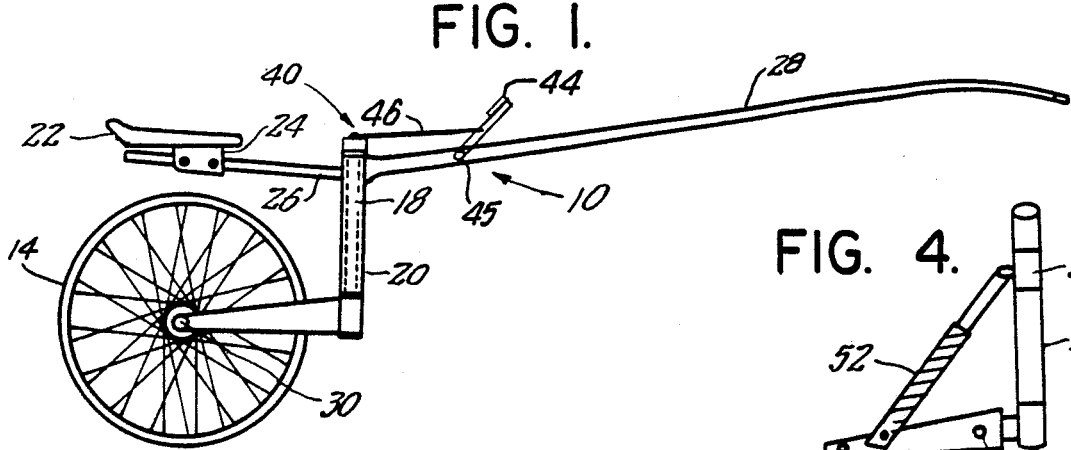
FIG. 1 is a side view of the self-aligning sulky of the present invention.

When the sulky of the present invention is in the preferred operational orientation as shown in FIG. 1, tube 20 is substantially vertical and seat 22 is approximately centered over the hubs 30 of wheels 14. This illustrates essentially no load on the horse. Moving the location of seat 22 closer to, or further from frame 12, will produce a positive load, or negative load respectively at the forward end of shafts 28.

As was discussed above, it is preferable that the axis about which wheels 14 pivot be substantially vertical. In order that this may be accomplished and to facilitate the harnessing of the sulky of the present invention to horses of differing stature and girth, shafts 28 are adjustably mounted to frame 12 by means of adjustment collars 32. Adjustment collars 32 comprise a compression joint 34 which surrounds and may slide along frame 12. Compression joint 34 is secured to frame 12 by bolts/nuts 35 which when tightened will cause compression joint 34 to compress and tighten about frame 12. For further security a lock pin 36 may be inserted through openings 37 in joint 34 and frame 12. Thus the angular position of shafts 28 are adjustable to correspond to the orientation which would be required for a range of common size horses (i.e. 14 "hands" to 17 "hands"). Furthermore the spacing between shafts 28 may also be adjusted by collars 32 to accommodate horses of varying girth.

In another embodiment, the sulky of the present invention may be provided with steering mechanism 40 to increase its maneuverability. Steering mechanism 40 comprises an arm 42 joined to the upper end of shaft 18 for rotation therewith, a foot pedal 44 hinged to an arm 45 extending from shaft 28 is connected to arm 42 by means of a connecting rod 46. When pedal 44 is depressed connecting rod 46 will move forward and cause arm 42 to rotate which will pivot wheel 14b clockwise. A second steering mechanism (not shown) is disposed at wheel 14a to cause it to pivot counterclockwise when its corresponding pedal is depressed. Note that steering mechanism 40 does not effect the ability of wheels 14 to completely pivot as pedal 44 will simply reciprocate when wheels 14 pivot. The steering mechanism 40 may also be provided by any suitable device which will change the orientation of at least one pivotable wheel 14a, 14b relative to frame 12, to provide a measure of control over the direction of travel followed by the sulky.

Figure 4:
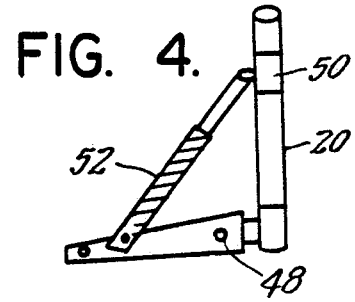
FIG. 4 is a detail view of another embodiment of a wheel pivoting mechanism including a suspension.
Figure 2:
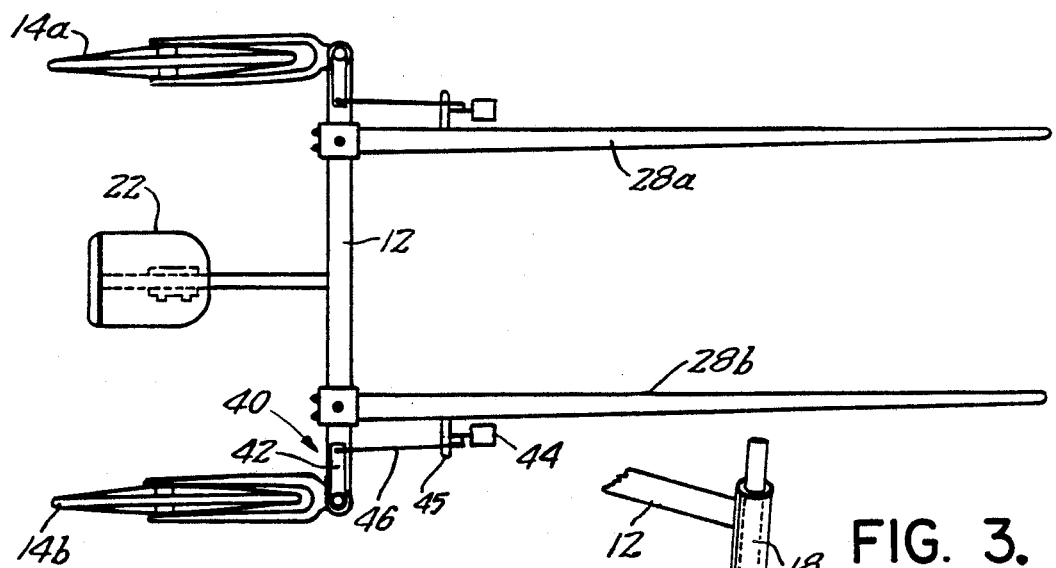
FIG. 2 is a plan view of the self-aligning sulky of the present invention showing an optional steering mechanism.

FIG. 4 illustrates an alternative embodiment for the wheel pivoting mechanism including a suspension. In this embodiment trailing arm 16 includes a hinge 48 to permit it to pivot up and down. A rotatable collar is disposed about the upper part of tube 20. Mounted between collar 50 and trailing arm 16 is a spring/shock unit 52 which provides the necessary spring and shock absorber action. Since collar 50 and trailing arm 16 are capable of pivoting a full 360° the inclusion of a suspension does not effect the self-aligning action of sulky 10.

Although the present invention has been described in conjunction with the preferred embodiments, it is to be understood that modifications and variations may be resorted to without departing from the spirit and scope of the invention as those skilled in the art will readily understand. Such modifications and variations are considered to be within the purview and scope of the invention and the appended claims.

I claim:

1. A self-aligning sulky having pivotable wheels which comprises:
    a transverse frame;
    first and second downwardly extending arms disposed at each end of said transverse frame;
    first and second trailing arms independently pivotally mounted to said downwardly extending arms, said arms being free to pivot through 360 degrees;
    first and second wheels, mounted for rotation to said trailing arms, said wheels being free to pivot through 360 degrees along with said trailing arms to thereby provide self-aligning action;
    seat means, for support of a driver, rearwardly mounted to said frame; and
    first and second shafts mounted to said frame, constructed and arranged to receive a horse, said shafts being forwardly projecting and substantially parallel.

2. The sulky of claim 1, wherein said first and second shafts are adjustably mounted to said frame to allow adjustment of the angular vertical displacement and the horizontal location of said shafts relative to said frame.

3. The sulky of claim 1, wherein said trailing arms are pivotable in a vertical plane, and suspension means are disposed between said trailing arms and said vertical arms.

4. The sulky of claim 1, wherein said seat includes means for adjusting its position with respect to said frame along the longitudinal axis of said sulky.

* * * * *